US012794796B2

(12) United States Patent
Mccollum et al.

(10) Patent No.: US 12,794,796 B2
(45) Date of Patent: Nov. 10, 2026

(54) METHODS AND SYSTEMS FOR AUTOMATED SCHEDULER-CONTROLLED PRE-JOB DEPLOYMENT NODE HEALTH TESTING IN A COMPUTING CLUSTER

(71) Applicant: Penguin Computing, Inc., Fremont, CA (US)

(72) Inventors: Nicholas Mccollum, Decatur, AL (US); Kevin Manalo, Saint Johns, FL (US)

(73) Assignee: Penguin Computing, Inc., Fremont, CA (US)

( * ) Notice: Subject to any disclaimer, the term of this patent is extended or adjusted under 35 U.S.C. 154(b) by 134 days.

(21) Appl. No.: 18/897,875

(22) Filed: Sep. 26, 2024

(65) Prior Publication Data

US 2026/0089081 A1 Mar. 26, 2026

(51) Int. Cl.
*G06F 15/173* (2006.01)
*H04L 43/0817* (2022.01)
*H04L 43/50* (2022.01)

(52) U.S. Cl.
CPC .......... *H04L 43/50* (2013.01); *H04L 43/0817* (2013.01)

(58) Field of Classification Search
CPC . H04L 43/50; H04L 43/0817; H04L 41/0895; G06F 11/3006; G06F 9/5044
See application file for complete search history.

(56) References Cited

U.S. PATENT DOCUMENTS

| | | | | |
|---|---|---|---|---|
| 11,303,512 | B1 * | 4/2022 | Grimes | H04L 41/0895 |
| 2014/0269342 | A1 * | 9/2014 | Baron | H04L 43/50 370/242 |
| 2016/0140001 | A1 * | 5/2016 | Kulkarni | G06F 11/3006 714/4.12 |
| 2019/0213046 | A1 * | 7/2019 | Matus | G06F 9/5044 |

* cited by examiner

*Primary Examiner* — Yves Dalencourt
(74) *Attorney, Agent, or Firm* — Padowithz Alce; Kristopher Novak; Alce PLLC

(57) ABSTRACT

A system and method for identifying a set of nodes within the cluster of nodes that are scheduled to execute a job at a future start time based on identifying, by a task scheduler, a request to execute the job within a cluster of nodes; submitting a set of initial health tests to the set of nodes for execution; identifying at least one pair of nodes that failed the set of initial tests; isolating the at least one pair of nodes from a remainder of the nodes that did not fail the set of initial health tests; submitting an additional health test to each node of the at least one pair of nodes; identifying a given node of the least one pair of nodes as being an unhealthy node; and adapting an operating state of the unhealthy node from a state of available to a state of unavailable.

20 Claims, 8 Drawing Sheets

METHODS AND SYSTEMS FOR AUTOMATED SCHEDULER-CONTROLLED PRE-JOB DEPLOYMENT NODE HEALTH TESTING IN A COMPUTING CLUSTER

TECHNICAL FIELD

This invention relates generally to the computer cluster management field, and more specifically to new and useful systems and methods for conducting health checks of and detecting unhealthy computing nodes and components of computing nodes in the computer cluster management field.

BACKGROUND

Traditional methods for ensuring the integrity and performance of a cluster of computers often rely heavily on self-reporting mechanisms from the hardware components or computers within the cluster. These methods await error signals such as logs, messages, or other indications from the hardware to identify issues. However, this approach is insufficient as it fails to detect problems that do not self-report, leading to undiagnosed issues that degrade cluster performance.

Some systems may employ single-point health checks provided by server hardware vendors, which monitor the status of a single computing node and its components. These systems are limited as they depend on the hardware's ability to recognize and communicate its own failures. Such reliance on self-reporting not only overlooks silent failures but also neglects the health of the network interconnected components. Given that modern GPU servers and similar servers are increasingly connected via high-speed fiber-optic networks, direct attach copper, and/or the like, this oversight can result in unacknowledged bottlenecks and faults within the cluster's communication infrastructure.

The technology introduced herein addresses the aforementioned limitations by providing a robust health check framework that actively tests nodes bi-directionally against their peers within the cluster. At least this innovative approach ensures the reliable detection of faulty computing nodes within a cluster without depending on vendor-specific, single-server health checks. By facilitating indirect testing of the network interconnects, the invention comprehensively evaluates the health of the entire cluster of computers, including various network components of the cluster of computers. Consequently, the inventions described herein offer improved systems and methods for maintaining optimal cluster performance and reliability.

SUMMARY OF THE INVENTION(S)

In one embodiment, a method for pre-job deployment node testing in a computing cluster includes: identifying a target set of computing nodes within the cluster of computing nodes that are scheduled to execute a job at a future start time based on identifying, by a computing task scheduler, a request to execute the job within a cluster of computing nodes; submitting, by the computing task scheduler, prior to the future start time, a set of initial health tests of the node health assessment to the target set of computing nodes for execution based on the identification of the target set of computing nodes; identifying at least one pair of computing nodes that failed the set of initial tests of the node health assessment based on the assessment results obtained from an execution of the set of initial health tests by the target set of computing nodes; isolating the at least one pair of computing nodes from a remainder of the computing nodes of the target set of computing nodes that did not fail the set of initial health tests; submitting one or more additional health tests to each computing node of the at least one pair of computing nodes; identifying a given computing node of the least one pair of computing nodes as being an unhealthy computing node based on assessment results obtained from an execution of the one or more additional health tests; and adapting an operating state of the unhealthy computing node from a state of available for executing the job to a state of unavailable for executing the job based on identifying the given computing node as the unhealthy computing node.

In one embodiment, the one or more additional health tests include a secondary health test that identifies which computing node of the at least one pair of computing nodes is unhealthy, the second health test includes: forming a first node pairing between a first computing node of the least one pair of computing nodes and a healthy computing node of the target set of computing nodes; forming a second node pairing between a second computing node of the least one pair of computing nodes and the healthy computing node of the target set of computing nodes; executing by the first node pairing and the second node pairing the second health test; and the identification of the unhealthy computing node is further based on assessment results of the execution of the second health test by the first node pairing and the second node pairing.

In one embodiment, the one or more additional health tests include a third health test that confirms a faultiness of the unhealthy computing node, the second health test includes: forming a node pairing between the unhealthy computing node and another healthy computing node of the target set of computing nodes; executing by the node pairing the third health test; and the confirmation of the faultiness of the unhealthy computing node is further based on assessment results of the execution of the third health test by the node pairing.

In one embodiment, the method includes reconfiguring the target set of computing nodes within the cluster of computing nodes by excluding the unhealthy computing node from executing the job at the future start time.

In one embodiment, the method includes determining, by the computing task scheduler, whether to submit the node health assessment to the target set of computing nodes based on the future start time of the job, wherein the determining includes identify whether an expected duration of the node health assessment exceeds the future start time of the job.

In one embodiment, the method includes identifying whether an expected extent of the node health assessment, if executed, exceeds the future start time of the job; scheduling the submission of the node health assessment to the target set of computing node for a period not exceeding the start time of the executed job based on the expected extent of the node health assessment not exceeding the future start time of the job.

In one embodiment, the computing task scheduler is configured to: assess an impact of the execution of the set of initial health tests on the future start time of the job and adjust a timing of the execution of the set of initial health tests ensuring a completion of the set of the initial health tests before the future start time of the job.

In one embodiment, the execution of the set of initial health tests includes: forming a plurality of distinct pairs of computing nodes from the target set of computing nodes; and executing a bi-directional testing by each pair of computing nodes of the plurality of distinct pairs of computing nodes.

In one embodiment, executing the bi-directional testing causes each respective pair of computing nodes of the plurality of distinct pairs of computing nodes to: establish a communication channel between computing nodes defining each respective pair of computing nodes, and execute the set of initial health tests by transmitting data associated with the execution of the set of initial health tests via the communication channel of each respective pair of computing nodes.

In one embodiment, a computer-program product includes a non-transitory machine-readable storage medium storing computer instructions that, when executed by one or more processors, perform operations including: identifying a target set of computing nodes within the cluster of computing nodes that are scheduled to execute a job at a future start time based on identifying, by a computing task scheduler, a request to execute the job within a cluster of computing nodes; submitting prior to the future start time, by the computing task scheduler, a set of initial health tests of the node health assessment to the target set of computing nodes for execution based on the identification of the target set of computing nodes; identifying at least one pair of computing nodes that failed the set of initial tests of the node health assessment based on the assessment results obtained from an execution of the set of initial health tests by the target set of computing nodes; isolating the at least one pair of computing nodes from a remainder of the computing nodes of the target set of computing nodes that did not fail the set of initial tests; submitting one or more additional health tests to each computing node of the at least one pair of computing nodes; identifying a given computing node of the least one pair of computing nodes as being an unhealthy computing node based on assessment results obtained from an execution of the one or more additional health tests; and adapting an operating state of the unhealthy computing node from a state of available for executing the job to a state of unavailable for executing the job based on identifying the given computing node as the unhealthy computing node.

In one embodiment, the one or more additional health tests include a secondary health test that identifies which computing node of the at least one pair of computing nodes is unhealthy, the second health test includes: forming a first node pairing between a first computing node of the least one pair of computing nodes and a healthy computing node of the target set of computing nodes; forming a second node pairing between a second computing node of the least one pair of computing nodes and the healthy computing node of the target set of computing nodes; executing by the first node pairing and the second node pairing the second health test; and the identification of the unhealthy computing node is further based on assessment results of the execution of the second health test by the first node pairing and the second node pairing.

In one embodiment, the one or more additional health tests include a third health test that confirms a faultiness of the unhealthy computing node, the second health test includes: forming a node pairing between the unhealthy computing node and another healthy computing node of the target set of computing nodes; executing by the node pairing the third health test; and the confirmation of the faultiness of the unhealthy computing node is further based on assessment results of the execution of the third health test by the node pairing.

In one embodiment, the computer-program product further includes reconfiguring the target set of computing nodes within the cluster of computing nodes by excluding the unhealthy computing node from executing the job at the future start time.

In one embodiment, the computer-program product further includes determining, by the computing task scheduler, whether to submit the node health assessment to the target set of computing nodes based on the future start time of the job, wherein the determining includes identify whether an expected duration of the node health assessment exceeds the future start time of the job.

In one embodiment, the computer-program product further includes identifying whether an expected extent of the node health assessment, if executed, exceeds the future start time of the job; scheduling the submission of the node health assessment to the target set of computing node for a period not exceeding the start time of the executed job based on the expected extent of the node health assessment not exceeding the future start time of the job.

In one embodiment, the computing task scheduler is configured to: assess an impact of the execution of the set of initial health tests on the future start time of the job, and adjust a timing of the execution of the set of initial health tests ensuring a completion of the set of the initial health tests before the future start time of the job.

In one embodiment, the execution of the set of initial health tests includes: forming a plurality of distinct pairs of computing nodes from the target set of computing nodes; and executing a bi-directional testing by each pair of computing nodes of the plurality of distinct pairs of computing nodes.

In one embodiment, executing the bi-directional testing causes each respective pair of computing nodes of the plurality of distinct pairs of computing nodes to: establish a communication channel between computing nodes defining each respective pair of computing nodes, and execute the set of initial health tests by transmitting data associated with the execution of the set of initial health tests via the communication channel of each respective pair of computing nodes.

In one embodiment, a computer-implemented method includes: identifying a target set of computing nodes within the cluster of computing nodes that are scheduled to execute a job at a future start time based on identifying, by a task scheduler, a request to execute the job within a cluster of computing nodes; submitting by the computing task scheduler, during an execution of a prolog script, prior to the future start time a set of initial health tests to the target set of computing nodes for execution based on the identification of the target set of computing nodes; identifying at least one pair of computing nodes that failed the set of initial tests based on the assessment results obtained from an execution of the set of initial health tests by the target set of computing nodes; isolating the at least one pair of computing nodes from a remainder of the computing nodes of the target set of computing nodes that did not fail the set of initial health tests; submitting an additional health test to each computing node of the at least one pair of computing nodes; identifying a given computing node of the least one pair of computing nodes as being an unhealthy computing node based on assessment results obtained from an execution of the additional health test; and adapting an operating state of the unhealthy computing node from a state of available for executing the job to a state of unavailable for executing the job based on identifying the given computing node as the unhealthy computing node.

In one embodiment, the additional health test includes a discovery health test that identifies which computing node of the at least one pair of computing nodes is unhealthy, the discovery health test includes: forming a first node pairing between a first computing node of the least one pair of computing nodes and a healthy computing node of the target set of computing nodes; forming a second node pairing between a second computing node of the least one pair of computing nodes and the healthy computing node of the target set of computing nodes; executing by the first node pairing and the second node pairing the second health test; and the identification of the unhealthy computing node is further based on assessment results of the execution of the discovery health test by the first node pairing and the second node pairing.

DESCRIPTION OF THE PREFERRED EMBODIMENTS

The following description of the preferred embodiments of the invention is not intended to limit the invention to these preferred embodiments, but rather to enable any person skilled in the art to make and use this invention.

Figure 1:
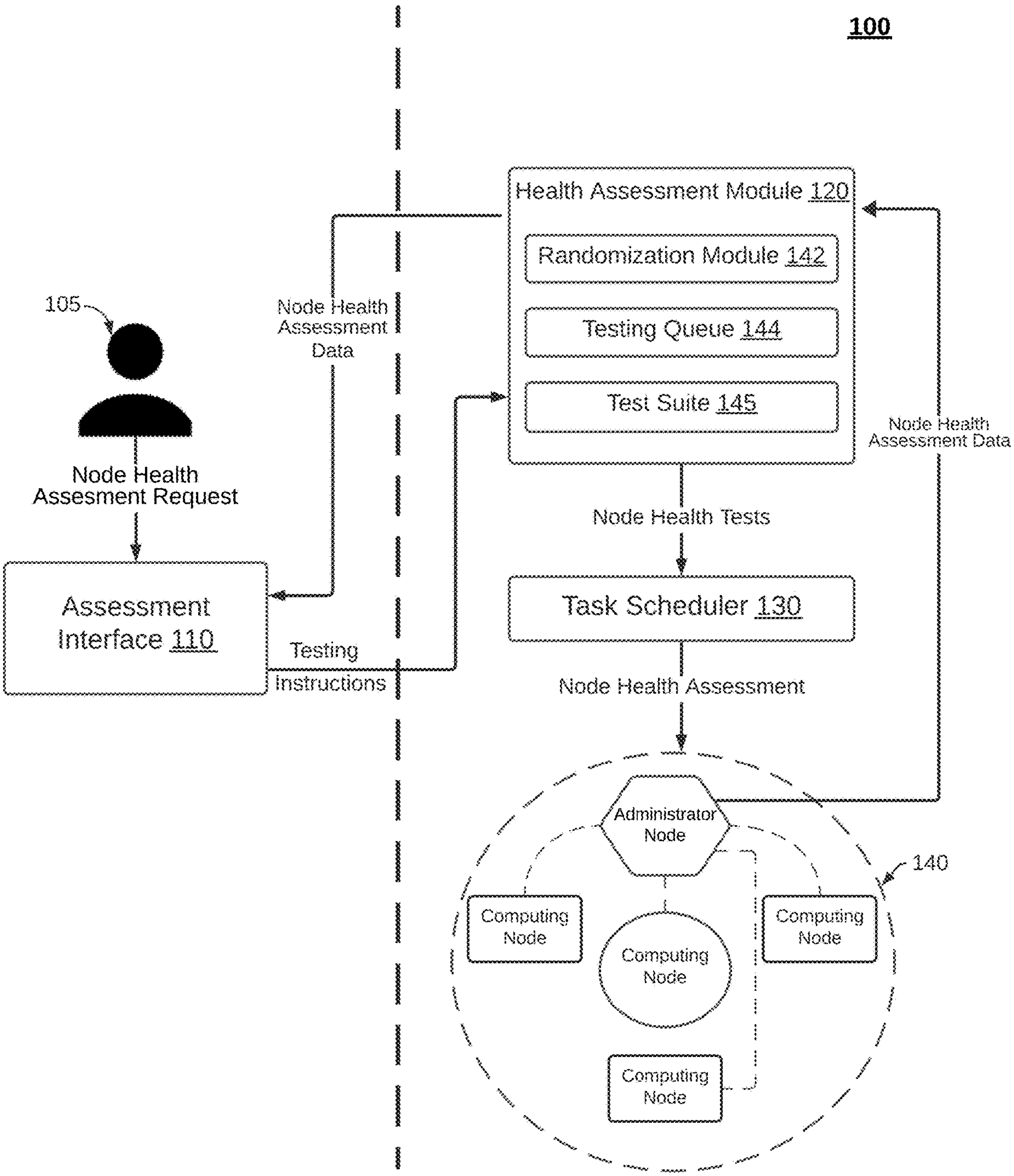
FIG. 1 illustrates a schematic representation of a system in accordance with one or more embodiments of the present application.
Figure 1A:
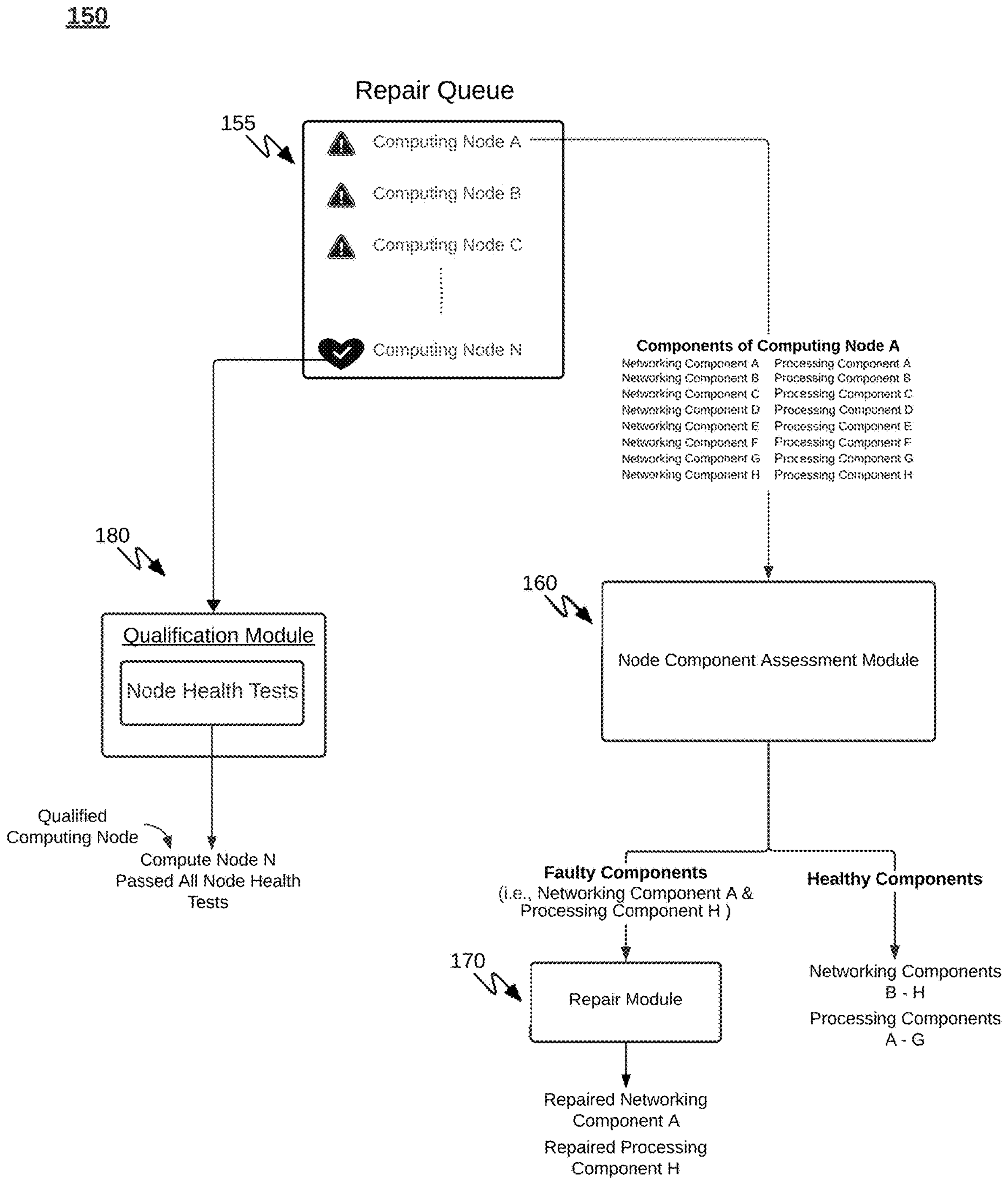
FIG. 1A illustrates a schematic representation of a subsystem of the system in accordance with one or more embodiments of the present application.

1. System for Enhanced Cluster Health Management and Unhealthy Node Detection As shown in FIG. 1, a system 100 implementing enhanced cluster health management and for detecting unhealthy computing nodes within a cluster of computer nodes includes a node health assessment interface 110, a health assessment module 120, and a task scheduler 130 for assessing the health of a cluster of computing nodes 140.

1.1 Computing Node Health Assessment Interface

The node health assessment interface 110, which may also be referred to herein as assessment interface 110, preferably includes a command interface or system programming interface or console through which an administrator 105 may operate to execute a node health assessment of a target cluster of computing nodes 140. In a preferred embodiment, the node health assessment interface 110 is preferably implemented by one or more computers and may be in operable control communication with one or more computing nodes of a target cluster of computing systems. In such preferred embodiment, the node health assessment interface 110 may function to receive, as input, one or more user commands for executing one or more aspects of a node health assessment of a target cluster of computing nodes 140 and output control signals to the one or more computing nodes of the target cluster of computing nodes 140.

In one or more embodiments, the one or more computing nodes of a target cluster of computing nodes 140 that may be operably controlled via the node health assessment interface 110 preferably include an administrator node. In such embodiments, the administrator node comprises one computing node of the target cluster of computing nodes 140 that may be in network communication with all computing nodes of the target cluster of computing nodes 140. The administrator node executing commands or instructions from the node health assessment interface 110 may function to administer any suitable tests to the target cluster of computing nodes 140 including, but not limited to, a node health assessment. In some embodiments, the administrator node may be referred to herein as a head node or a control node depending on its operation within the cluster of computing nodes 140. Accordingly, the administrator node 105 may have installed cluster management software or similar applications that preferably enables the administrator node 105 to coordinate activities of the cluster of computing nodes 140, manage resource allocation, perform scheduling (e.g., integrated scheduler 130), and/or support maintaining an overall health of the cluster of computing nodes 140.

Additionally, or alternatively, the administrative node may be in operable control communication of a parallel file system or the like for administering any suitable tests, including a node health assessment, to a target cluster of computing nodes 140. Additionally, or alternatively, the administrative node may include an assessment agent installed thereon that may be in communication and operably controlled via commands from the node health assessment interface 110. In some embodiments, the node health assessment agent of the administrator node based on command inputs from the node health assessment interface 110 may function to automatically execute one or more operations or functions of a node health assessment against a target cluster of computing nodes 140.

1.2 Health Assessment Module

The health assessment module 120, in one or more embodiments, which is in operable communication with one or more of the node health assessment interface 110, the node assessment scheduler 130, and cluster of computing nodes 140 may operate to configure one or more node health assessments and/or execute one or more node health assessments against a target set of computing nodes of the cluster of computing nodes 140. In one or more embodiments, the health assessment module 120 may function to store and/or have access to a test suite 145, which is sometimes referred to herein as a pool of node health tests, that includes a plurality of node health tests. At runtime, the health assessment module 120 may function to source from the test suite 145 one or more node health tests, which may be executed either serially or in parallel against computing nodes of the cluster of computing nodes 140.

In one or more embodiments, the health assessment module 120 may be implemented in cooperation with a network file system, a parallel file system or the like. In such embodiments, the health assessment module 120 may be implemented by an administrative computing node of a target cluster of computing nodes, the administrative computing node may be sometimes referred to herein as a "head node" or "node zero". Additionally, or alternatively, each computing node in the target cluster of computing nodes may store a copy of the tests and/or assessments associated with an operation of the health assessment module 120. In this way, commands and/or signals from the health assessment module 120 may cause any or each of the computing nodes of the target cluster to access one or more tests and/or assessments and execute the tests or assessments concurrently. In such embodiments, the outputs of the execution of the tests and/or assessments by the target cluster of computing nodes may be stored to or served out to the network file system.

Additionally, or alternatively, the health assessment module 120 may function to implement and/or include one or more of a randomization module 142 and a testing queue 144 that may operate together for initializing and executing a node health assessment of computing nodes of a cluster of computing nodes 140. In one or more embodiments, the randomization module 142 may function to ensure that different first computing nodes are seeded to prevent biased results on the basis of an initial computing node selection from a batch of computing nodes subject to a node health assessment.

1.3 Automated Task Scheduler

The task scheduler 130 preferably functions as an orchestration layer that automatically facilitates a node health assessment. In a preferred embodiment, the task scheduler 130 may function to integrate node health assessments directly into an operational workflow of the cluster of computing nodes 140. Accordingly, the task scheduler 130 may be multi-faceted in its automated application of node health assessments on a predetermined schedule or dynamically during a pre-job deployment of a batch of computing nodes. It shall be recognized that the task scheduler 130 may sometimes be referred to herein as an "automated task scheduler" or a "computing task scheduler".

In one or more embodiments, the task scheduler 130 may function to continually and/or periodically monitor a state of computing nodes within the cluster of computing nodes 140 to identify idle computing nodes that are not currently allocated to user jobs. In such embodiments, the task scheduler 130 may batch the idle computing nodes to the node testing queue 144 for a node health assessment.

Additionally, or alternatively, in one or more embodiments, the task scheduler 130 may function programmed or configured to automatically execute node health tests. In such embodiments, the task scheduler 130 may be programmed or configured with node health testing parameters thereby enabling the task scheduler 130 to identify candidate computing nodes that may be eligible for a node health assessment.

As a non-limiting example, the health testing parameters may include one or more node health assessment criteria including non-interference automated node testing instructions. In such example, the non-interference automated node testing instructions, when executed by the task scheduler 130, prioritizes for the node health assessment computing nodes of the plurality of idle nodes without a scheduled computing task while bypassing computing nodes of the plurality of idle nodes with scheduled computing tasks.

It shall be recognized that the task scheduler 130 may be configured and/or encoded with any suitable set of instructions that enable the task scheduler 130 to perform the processes, steps, and/or methods described herein including, but not limited to, those described in method 200 and the methods of the incorporated patent applications.

1.4 Cluster of Computing Nodes

The cluster of computing nodes 140 preferably includes a plurality of distinct computing nodes where each distinct node comprises a computer. In a preferred embodiment, the computer typically includes a server-grade machine, equipped with one or more of central processing units (CPUs), graphical processing units (GPUs), both, or similar processing components capable of executing tasks and running applications. In one or more embodiments, the plurality of distinct computing nodes in a cluster may include network interconnects comprising high-speed communication pathways that link the computing nodes together, facilitating rapid data transfer. One or more examples of network interconnects may include, but should not be limited to, InfiniBand, Ethernet, fiber-optic connections that may enable the computing nodes to operate in concert for distributed computing tasks.

Additionally, or alternatively, a cluster of computing nodes may include a storage system having an associated memory or data storage solutions that may range from local disk drives within each computing node of the cluster of computing nodes 140 to shared storage systems, such as storage area network (SAN) or network attached storage (NAS), accessible by all computing nodes in cluster 140 for distributed file systems and data persistence. In a preferred embodiment, the cluster of computing nodes 140 preferably employs a parallel file system that allows multiple computing nodes to access and process data simultaneously, which may increase throughput and efficiencies of the computing nodes.

1.5 Subsystem for Faulty Component Detection

Figure 2:
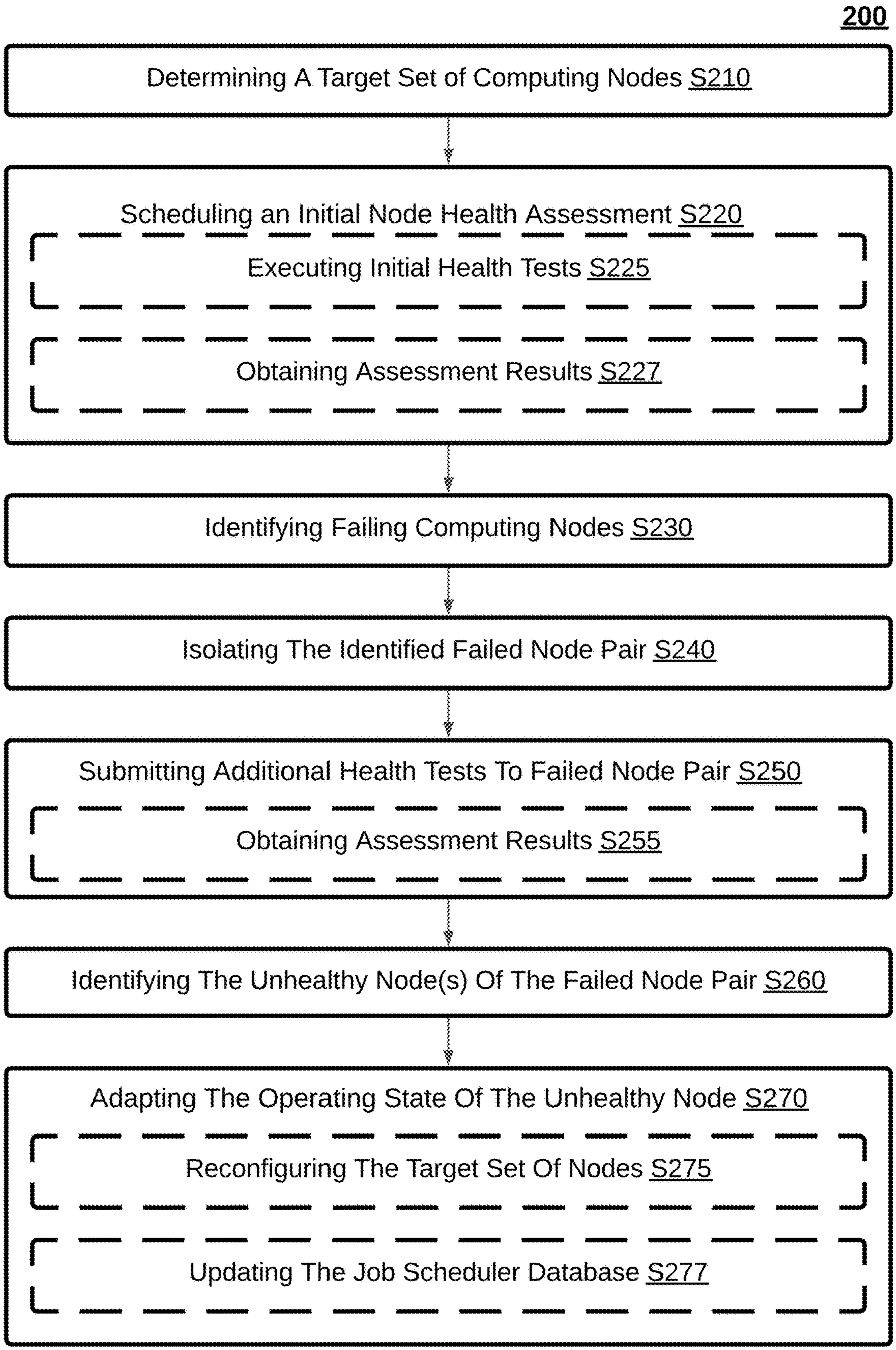
FIG. 2 illustrates an example method in accordance with one or more embodiments of the present application.

In one or more embodiments, system 100 includes the subsystem 150 for enhanced identification and/or detection of faulty components of a suspected unhealthy computing node, as shown by way of example in FIG. 2. Subsystem 150 preferably functions to evaluate a component health of a target computing node that may have been classified as being unhealthy. That is, in one or more embodiments, subsystem 150 in operation may function to identify and/or characterize one or more faulty components of a target computing node by executing a component node health assessment for one or more hardware and/or software components of the target computing node.

In some embodiments, the subsystem 150 may include or may be in operable communication with a repair queue 155, a node component assessment module 160, a repair module 170, and a qualification module 180. The repair queue 155 preferably includes a data structure or the like storing a listing or mapping of one or more computing nodes having a classification of an unhealthy state. In other words, the repair queue 155 preferably functions to itemize computing nodes that may need repair resulting from non-performant components or similar hardware or software failures. The repair queue 155, in such embodiments, may include a listing of unhealthy computing nodes together with associated node health assessment data observed or collected from one or more upstream health assessments (e.g., node health assessment module 120 or the like).

The node component assessment module 160, which is sometimes referred herein as the "node component health assessment module" preferably functions to assess a relative health of the components of a target computing node. In some embodiments, the node component assessment module 160 sources or identifies a target computing node for an assessment from repair queue 155, however, it shall be recognized that node component assessment module 160 may identify or receive a target computing node for an assessment from any source. In one or more embodiments, the node component assessment module 160 may function to prepare the components of a target computing node for testing by generating a plurality of unique combination of node component pairs based on an input of a listing or the like of the components of the target computing node and a listing or the like of the components of a healthy (i.e., golden model) target computing node. In a preferred embodiment, node component health assessment module 160 may function to compute a Cartesian product between the set of components of the target computing node (e.g., unhealthy computing node) and the set of components of the healthy computing node. As a result, node component health assessment module 160 may function to generate or output a listing or a mapping of all possible unique pairings between the components of the target computing node and the healthy computing node for peer-to-peer testing and/or the like.

Additionally, or alternatively, node component assessment module 160 may have access to a node component test suite that includes a plurality of tests for evaluating various components of a computing node. In some embodiments, node component assessment module 160 may implement a test selection matrix (not shown) that includes a mapping between distinct components mapped to or associated with one or more available tests for evaluating the associated components.

In use, node component assessment module 160 preferably performs an assessment of the components of a target computing node and may function to output one or more signals or classifications indicating whether a component of the target computing node is healthy or faulty. In the circumstances in which a component is classified by node component assessment module 160 as faulty, node component assessment module 160 may route data associated with the component classified as being faulty (i.e., the faulty node component) to repair module 170 for remediating the one or more faults or defects of the target computing node.

In one or more embodiments, once a computing node has been repaired via one or more operations associated with the repair module 170, the qualification module 180 may be implemented for ensuring that the repaired computing node is healthy and readied to return to service. In such embodiments, the qualification module 180 may function to execute a standard suite of health tests against the repaired computing node that may confirm or validate that the repairs to the repaired computing node are successful. In a variation, the qualification module 180 may function to execute a select set of health tests based on the one or more node components that were repaired. In such variation, the qualification module 180 may function to select one or more tests that map to a fault type or previously faulty node components for qualifying the repaired computing node. In response to a successful qualification (e.g., satisfaction of the one or more node health tests), the qualification module 180 may function to flag and/or identify the repaired computing node as being ready for service. Conversely, if the qualification is unsuccessful, the qualification module 180 may function to route the repaired computing node upstream to one or more of the health assessment module 120, the subsystem 150, and/or any other module or component of the system 100 for identifying a health state of the repaired computing node and/or fault characterization of one or more components of the repaired computing node.

2. Method of Implementing a Scheduler for Automated Node Health Assessments

As shown in FIG. 2, a method 200 for executing by a task scheduler an a preemptive automated node health assessment in a cluster of computing nodes in advance of executing a job by the cluster of computing nodes includes identifying a job execution request S205, determining a target set of computing nodes within the cluster for executing the requested job S210, scheduling an initial node health assessment of the target set of computing nodes S220, executing initial health tests on the target set of computing nodes S225, obtaining assessment results from the execution of the initial health tests S227, identifying failed or unhealthy computing nodes within the target set S230, isolating the identified failed node pairs from the target set S240, submitting additional health tests to the isolated nodes S250, obtaining additional assessment results from the execution of the additional health tests S255, identifying unhealthy computing nodes from the additional assessment results S260, adapting the operating state of the unhealthy nodes S270, reconfiguring the target set of nodes by replacing unhealthy nodes with healthy alternatives S275, and updating the job scheduler database with the revised configuration and status of the target set of nodes S277.

The method 200 as implemented by one or more systems (e.g., system 100) preferably provides an automated approach for managing job execution and ensuring node reliability within a computing cluster. In particular, the method 200 functions to integrate job scheduling and node health assessment capabilities into a unified job scheduler for a cluster of computing nodes. The resulting scheduler may function to dynamically and autonomously identify job execution requests, evaluate and select an optimal set of computing nodes, conduct preemptive health assessments, and manage job execution resources, all without human intervention. By continually monitoring the operational status and health of each computing node, the scheduler identifies potential issues proactively, reallocates resources, and adapts job execution plans to maintain optimal performance and prevent performance degradation within the computing cluster.

2.05 Identifying Job Execution Request

S205, which includes identifying a job execution request, may function to detect, by a computing task scheduler, a request to execute a job within a cluster of computing nodes. In a preferred embodiment, the computing task scheduler may be configured to continuously or periodically monitor incoming job submission interfaces or job queues that may be accessible within a cluster management environment. The job execution request may originate from a user or an automated process and may specify a set of requirements or attributes related to the job, such as computational resources, priority, or start time.

Additionally, or alternatively, the computing task scheduler may function to actively listen for job submission signals or queries that indicate a new job request or may be configured to retrieve job requests from a designated job queue or job submission interface. In one or more embodiments, the job request may include metadata such as job identification, job type, required resources (e.g., CPU cores, memory, storage), anticipated runtime, and user-defined constraints or preferences. The computing task scheduler may parse and interpret the metadata to identify key parameters and characteristics of the job execution request.

Figure 3:
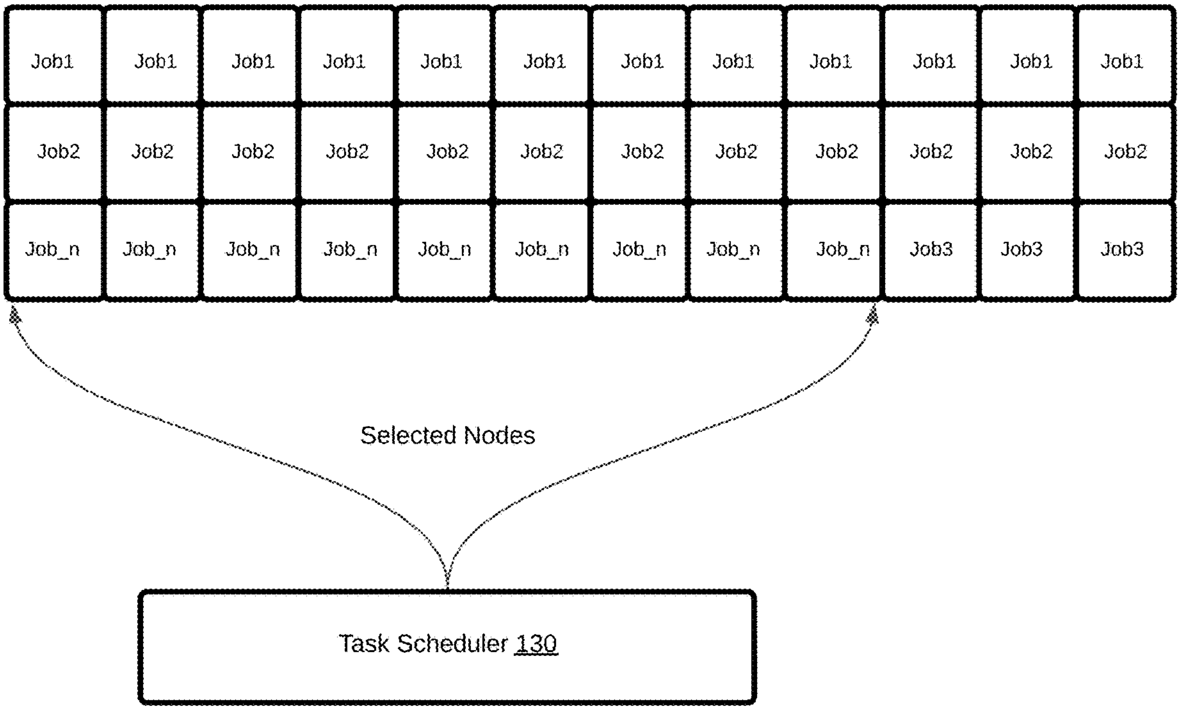
FIG. 3 illustrates an example schematic for identifying a target set of computing nodes of a cluster of computing nodes in accordance with one or more embodiments of the present application.

Accordingly, the computing task scheduler may, in one or more embodiments, function to analyze the job execution request and determine a target set of computing nodes within the cluster that are capable of executing the requested job, as shown by way of example in FIG. 3. This analysis may include evaluating the computational requirements of the job against the available resources within the cluster. In some embodiments, the computing task scheduler may employ predefined job scheduling policies or algorithms, such as load balancing, fairness, or priority-based scheduling, to identify an optimal target set of computing nodes.

In response to identifying the job execution request, S205 may cause the computing task scheduler to reserve the identified target set of computing nodes for the execution of the job at a future start time. In one or more embodiments, reserving the target set may involve updating the cluster management system's resource allocation records to temporarily mark the selected computing nodes as "reserved" or "allocated" for the specified job, thereby preventing conflicting job assignments.

In one or more embodiments, S205 may further function to determine a future start time for the job based on the scheduling policies or constraints defined in the job execution request. This may include assessing factors such as job priority, resource availability, and cluster workload, and may involve computing an estimated start time that minimizes job wait time while optimizing overall cluster efficiency.

At least one technical benefit of identifying a job execution request as described herein is to ensure efficient resource allocation and scheduling within the cluster, thereby optimizing the utilization of available computing resources and minimizing job wait times. By accurately identifying job execution requests and preemptively reserving the required resources, the computing task scheduler can effectively manage workload distribution and maintain a high level of operational performance across the cluster.

2.10 Identifying Target Set of Computing Nodes

S210, which includes identifying a target set of computing nodes, may function to determine, by a computing task scheduler, a specific subset of computing nodes within a cluster that are scheduled to execute a requested job at a future start time. In a preferred embodiment, the computing task scheduler may analyze the job requirements received in S205 to establish the optimal configuration of computing nodes required to execute the job efficiently. This analysis may consider factors such as computational capacity, memory availability, data storage, network connectivity, and other performance metrics of the computing nodes.

Additionally, or alternatively, the target set of computing nodes identified by the computing task scheduler preferably comprises nodes that satisfy job-specific constraints, such as required processing power (e.g., CPU, GPU), networking capabilities, memory, disk space, and other hardware or software dependencies. In one or more embodiments, the computing task scheduler may evaluate the cluster's current state to determine which nodes are available and suitable for executing the job based on their operational status, historical performance, and resource utilization patterns.

Accordingly, in one or more embodiments, the computing task scheduler may utilize a node selection algorithm to dynamically assign the target set of computing nodes. This selection process may involve applying predefined scheduling policies, such as load balancing, energy efficiency, or minimum communication latency, to optimize the selection of nodes. The algorithm may prioritize nodes that are physically co-located or have high network throughput to minimize data transfer times and improve overall job performance.

In some embodiments, the computing task scheduler may function to rank all available computing nodes based on their suitability for the job requirements and select the highest-ranking nodes for the target set. The ranking may be determined using criteria such as current workload, historical reliability, fault tolerance, network proximity, and compatibility with the job's computational needs. For instance, nodes with a recent history of failures or degraded performance may be deprioritized in favor of more reliable nodes.

S210 may further include dynamically adjusting the target set of computing nodes as needed, in response to changes in the cluster environment or job requirements. For example, if a node becomes unavailable due to a failure or a competing job assignment, the computing task scheduler may automatically select an alternative node that meets the job's criteria, ensuring that the target set remains optimal for the job's execution.

Additionally, or alternatively, S210 may involve preemptively reserving the identified target set of computing nodes by updating the resource allocation status of each selected node within the cluster management system. This reservation may ensure that the nodes remain available for the job at the designated future start time, thereby preventing conflicts or delays caused by resource contention.

At least one technical benefit of identifying the target set of computing nodes as described herein is to optimize resource allocation and scheduling within the cluster, ensuring that the selected nodes meet the job's specific requirements and can execute the job efficiently. By dynamically selecting and reserving an optimal set of nodes, the computing task scheduler helps maintain overall cluster performance and minimizes job execution times.

2.20 Scheduling Initial Node Health Assessment

Figure 4:
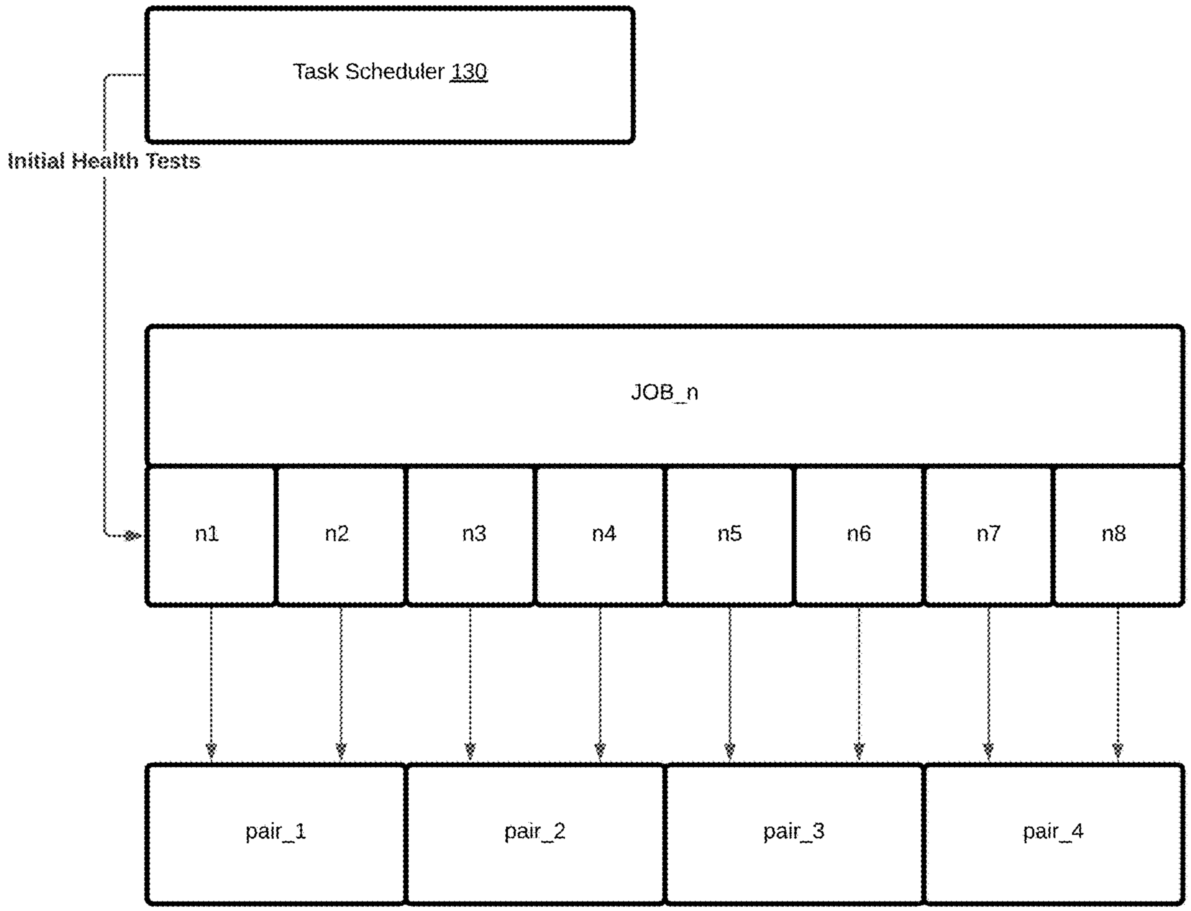
FIG. 4 illustrates an example schematic for submitting an initial health tests of a node health assessment in accordance with one or more embodiments of the present application.

As shown by way of example in FIG. 4, S220, which includes scheduling and/or submitting an initial node health assessment, may function to determine, by a computing task scheduler, an appropriate time to conduct a set of preliminary or preemptive health tests on the target set of computing nodes identified in S210 before the execution of a scheduled job. In a preferred embodiment, the computing task scheduler may dynamically evaluate the timing constraints associated with the job, such as the job's future start time, the anticipated duration of the node health assessment, and the availability of the computing nodes, to optimize the scheduling of the node health assessment.

Additionally, or alternatively, the scheduling of the initial node health assessment may be based on factors such as current and projected workloads within the cluster, node usage history, and predefined health assessment policies. In one or more embodiments, the computing task scheduler may prioritize scheduling the health assessment at a time when the impact on other cluster operations is minimized, such as during periods of low computational demand or idle times.

Accordingly, in one or more embodiments, the computing task scheduler may analyze the expected duration of the initial health assessment in relation to the scheduled job's future start time. The analysis by the computing task scheduler, in some embodiments, may involve determining whether the node health assessment can be completed within the available time window without delaying the start of the job. The computing task scheduler may use historical data, node performance metrics, and health test duration estimates to predict the total time required for the node health assessment and adjust the schedule accordingly.

In some embodiments, S220 may include adjusting the timing of the node health assessment dynamically in response to changes in the cluster environment or job schedule. For example, if the start time of the job is rescheduled or if new jobs are added to the cluster that might affect resource availability, the computing task scheduler may re-evaluate and reschedule the node health assessment to ensure it is conducted at an optimal time.

Additionally, or alternatively, S220 may function to allocate sufficient time for each step of the health assessment process, such as initializing the node health assessment, executing the health tests, and collecting the results. The computing task scheduler may divide the node health assessment into phases and assign specific time slots for each phase, ensuring that the entire process is completed efficiently and within the time constraints.

In one or more embodiments, S220 may further involve determining whether the node health assessment is necessary based on the recent history and current status of the computing nodes in the target set. If the nodes have recently passed similar health tests or have a history of reliable performance, the computing task scheduler may opt to skip, bypass, or shorten the node health assessment to save time and resources.

Accordingly, in one or more embodiments, S220 may function to submit the initial node health assessments to the target set of computing nodes (identified in S210) based at least one determining that the initial node health assessment will likely not interfere with a predetermined scheduled start time of the scheduled job to be executed by the target set of computing nodes.

In one variation, S220 may function to cause a submission and/or an execution of the initial node health assessments during a prolog. In one or more embodiments, the prolog may be a prolog script that may be executed before or immediately before the scheduled job begins on the target set of computing nodes. During an execution of a prolog script in S220 or the like, the prolog script may be executed for setting up or configuring a required environment for the scheduled job, such as loading software modules, configuring network settings, or allocating specific resources like CPU or GPU cores or memory. Accordingly, in S220 or the like, executing the prolog script may function to initialize the computing environment for the scheduled job and contemporaneously or in parallel, execute the initial node health assessments that perform a set of node health assessments (e.g., initial, second, third node health assessments and the like) on the target set of computing nodes that have been assigned to the scheduled job.

2.25 Executing Initial Health Tests

Additionally, or alternatively, S220 may include S225, which includes executing initial health tests, may function to initiate, by a computing task scheduler, the performance of a set of preliminary health assessments on the target set of computing nodes identified in S210 prior to job execution. In a preferred embodiment, the computing task scheduler may transmit a series of commands or instructions to the selected computing nodes, directing the target set of computing nodes to perform specific health tests designed to evaluate the readiness and operational status of the target set of or selected computing nodes for the upcoming job.

Additionally, or alternatively, the initial health tests may include various diagnostic checks to assess critical performance metrics, such as CPU and GPU utilization, memory integrity, disk health, network connectivity, and power supply stability. In one or more embodiments, these tests may be designed to run in parallel across multiple nodes to reduce the total time required for the node health assessment and minimize the impact on cluster operations.

Accordingly, in one or more embodiments, the computing task scheduler may coordinate the execution of the initial health tests by establishing communication channels with each node in the target set and monitoring the progress of the tests in real-time as described in U.S. patent application Ser. Nos. 18/604,417, 18/604,425, and 18/778,312, which are incorporated herein in their entireties. The computing task scheduler may manage the sequencing of test steps to ensure that all necessary checks are completed efficiently and may dynamically adjust test parameters based on initial results or detected anomalies.

Figure 5:
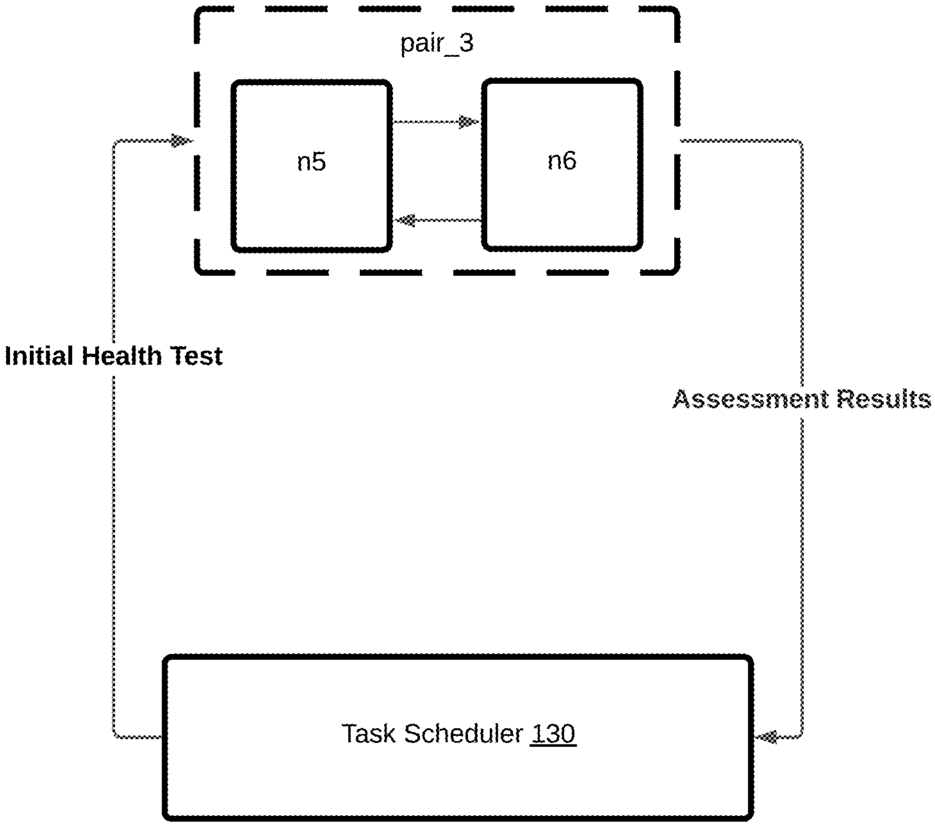
FIG. 5 illustrates an example schematic executing the initial health tests within a pair of computing nodes in accordance with one or more embodiments of the present application.

In some embodiments, S225 may further include conducting bi-directional tests between distinct pairs of computing nodes within the target set to evaluate inter-node communication and data transfer integrity, as shown by way of example in FIG. 5. These bi-directional tests may involve exchanging data packets, conducting latency measurements, and verifying the successful transmission and receipt of information across network interfaces to ensure reliable connectivity between the nodes.

Additionally, or alternatively, S225 may involve performing stress tests on the computing nodes to identify potential weaknesses or faults that may not be detected under normal operational conditions. For example, the stress tests may simulate high computational loads, intensive memory usage, or prolonged periods of network activity to verify the stability and resilience of the nodes. The computing task scheduler may control the intensity and duration of these tests to match the expected demands of the upcoming job.

In response to executing the initial health tests, S225 may function to collect and analyze the node health assessment data generated by each computing node. This may include receiving test results, performance metrics, error logs, and diagnostic information from each node, and compiling the data into a comprehensive report. The computing task scheduler may evaluate the report to determine if all nodes have met the required health standards or if further action is necessary to address identified issues.

In one or more embodiments, S225 may also involve taking immediate corrective actions based on the initial test results. For instance, if a node is identified as failing a critical health test, the computing task scheduler may remove it from the target set and trigger additional tests to confirm the failure or identify specific faults. The computing task scheduler may then reassign the job to alternative nodes or initiate a remediation process for the faulty node.

At least one technical benefit of scheduling the initial node health assessment as described herein is to ensure that the target set of computing nodes is in optimal condition for executing the job while minimizing delays and resource conflicts. By dynamically scheduling the health assessment based on real-time and historical data, the computing task scheduler can prevent potential failures or performance degradation, thereby enhancing overall cluster reliability and efficiency.

2.27 Obtaining Initial Assessment Results

S227, which includes obtaining initial assessment results, may function to collect, by a computing task scheduler, the outcome or results of the initial health tests executed in S225 across the target set of computing nodes. In a preferred embodiment, the computing task scheduler may establish communication with each node in the target set to retrieve the results of the health assessments, including performance metrics, error logs, and diagnostic data generated during the testing process.

Additionally, or alternatively, obtaining the initial assessment results may involve the computing task scheduler continuously or periodically polling each node for test status updates and partial results, thereby enabling real-time monitoring of the health assessment progress. In one or more embodiments, the computing task scheduler may implement a results aggregation mechanism that collects test data from multiple nodes and compiles it into a centralized report for further analysis.

Accordingly, in one or more embodiments, the initial assessment results may include various types of data, such as CPU and GPU performance measurements, memory integrity checks, disk read/write speeds, network latency, packet loss rates, and power supply voltage levels. This data may be used to determine the operational status of each computing node and identify any deviations from expected performance thresholds.

In some embodiments, S227 may further include performing an initial validation of the obtained assessment results to ensure completeness and accuracy. The computing task scheduler may check for missing data, inconsistent metrics, or potential errors in the test results, and may initiate re-testing or corrective actions if necessary. For example, if the results indicate a potential false positive due to transient network issues, the computing task scheduler may rerun specific tests to confirm the node's health status.

Additionally, or alternatively, S227 may involve analyzing the collected assessment results using predefined health criteria or performance benchmarks to classify each node as "healthy," "unhealthy," or "needs further evaluation." This classification process may involve comparing each node's test results against baseline performance data or acceptable operational ranges to determine its readiness for the upcoming job.

In response to obtaining the initial assessment results, S227 may function to update the operational status of each node within the cluster management system. Computing nodes classified as "healthy" may be confirmed for job execution, while those identified as "unhealthy" may be flagged for exclusion or further testing. The computing task scheduler may adjust the resource allocation plan, accordingly, ensuring that only computing nodes meeting the required health standards are included in the target set for the job.

In one or more embodiments, S227 may also involve generating a detailed health report for the cluster administrator, summarizing the results of the initial health tests and any identified issues. This report may provide insights into the overall cluster health and highlight potential areas for improvement or maintenance.

At least one technical benefit of obtaining the initial assessment results as described herein is to provide a reliable basis for decision-making regarding node readiness and job scheduling. By accurately collecting and validating the health test data, the computing task scheduler can ensure optimal job execution and prevent resource allocation to faulty or underperforming nodes, thereby enhancing overall cluster efficiency and reliability.

2.3 Identifying Faulty or Unhealthy Computing Nodes

S230, which includes identifying failed computing node pairs, may function to analyze, by a computing task scheduler, the initial assessment results obtained in S227 to determine specific pairs of computing nodes within the target set that have failed the initial health tests. In a preferred embodiment, the computing task scheduler may evaluate the node health assessment data for each node pairing, including metrics such as processing errors, communication failures, latency issues, and any discrepancies in performance measurements, to identify node pairs that do not meet the established health criteria.

Additionally, or alternatively, the identification of failed node pairs may involve applying a fault detection algorithm to the node health assessment results. This algorithm may be designed to detect patterns of failures or anomalies, such as nodes that consistently show high error rates or communication breakdowns when tested in specific pairings. In one or more embodiments, the algorithm may be configured to flag node pairs for further evaluation if their performance metrics fall below a predetermined threshold or exhibit unusual behavior compared to baseline data.

Accordingly, in one or more embodiments, the computing task scheduler may cross-reference the node health assessment results against historical performance records of the computing nodes. By comparing current test outcomes with previous data, the computing task scheduler may identify recurring issues or trends that indicate a potential node failure or degradation over time. Accordingly, such an evaluation may aid the computing task scheduler in distinguishing between transient failures, such as temporary network issues, and persistent faults that may require immediate remediation.

In some embodiments, S230 may further include conducting additional diagnostic checks on the identified failed node pairs to pinpoint the root cause of the failure, as described by way of example in S240-S260. These checks may involve running targeted health tests, such as deep memory scans, disk integrity tests, or specific network diagnostics, on each node within the failed pair. The computing task scheduler may dynamically adjust the diagnostic parameters based on initial findings to narrow down the potential fault sources more effectively.

Additionally, or alternatively, S230 may involve categorizing the failed node pairs based on the nature and severity of the detected issues. For example, node pairs with critical faults, such as hardware malfunctions or severe connectivity problems, may be prioritized for immediate exclusion from the target set. In contrast, node pairs with minor or recoverable faults may be subjected to further testing or temporary isolation to confirm their health status.

In response to identifying the failed node pairs, S230 may function to update the operational state of the affected nodes within the cluster management system. Computing nodes that are part of the failed pairs may be marked as "under review" or "excluded" from job execution, and the computing task scheduler may adjust the resource allocation plan to replace these nodes with healthy alternatives, ensuring that the job can proceed without disruption.

In one or more embodiments, S230 may also involve generating a failure report for the cluster administrator, detailing the identified failed node pairs, the specific reasons for their failure, and any recommended actions for remediation or replacement. This report may provide valuable insights into the cluster's overall health and help guide future maintenance or optimization efforts.

2.4 Isolating Failed Node Pairs

S240, which includes isolating failed node pairs, may function to segregate, by a computing task scheduler, the identified pairs of computing nodes that failed the initial health tests in S230 from the remainder of the target set of computing nodes. In a preferred embodiment, the computing task scheduler may implement a node isolation protocol to ensure that the failed node pairs are excluded from participating in the scheduled job execution, thereby preventing potential faults from affecting the job's performance and overall cluster stability.

Additionally, or alternatively, isolating the failed node pairs may involve modifying the configuration of the target set by dynamically updating the status of each node in the failed pairs to "isolated" or "quarantined" within the cluster management system. This status change may trigger automatic adjustments in the cluster's resource allocation and task scheduling mechanisms, ensuring that the isolated nodes are no longer available for job assignments until further action is taken.

Accordingly, in one or more embodiments, the computing task scheduler may initiate a series of remedial actions to contain any potential faults associated with the failed node pairs. These actions may include disabling network connectivity for the isolated nodes, halting all active processes, and flushing any residual data or cache that could interfere with subsequent diagnostics or recovery efforts. The computing task scheduler may employ secure communication protocols to execute these actions without disrupting the operations of healthy nodes.

In some embodiments, S240 may further include reconfiguring the job execution plan to account for the removal of the failed node pairs. The reconfiguration of the job execution plan may involve reallocating tasks initially assigned to the isolated nodes to alternative healthy nodes within the cluster, optimizing the distribution of computational workloads to maintain the job's performance and minimize execution delays. The computing task scheduler may utilize load-balancing algorithms or predictive resource management techniques to ensure an equitable distribution of tasks across the remaining nodes.

Additionally, or alternatively, S240 may involve conducting secondary assessments on the isolated nodes to determine the specific nature and extent of the identified faults. These assessments may include more targeted tests, such as component-level diagnostics or in-depth network analysis, to identify whether the fault is hardware-related, software-related, or due to environmental factors. Based on the results, the computing task scheduler may decide whether to reintegrate the nodes into the cluster or proceed with further remediation.

In response to isolating the failed node pairs, S240 may function to update the cluster's health management records and notify relevant system administrators of the isolation event. The notification may include details such as the computing nodes involved, the reasons for their isolation, and any recommended actions for remediation or repair. The computing task scheduler may also log the notification to facilitate future diagnostics and trend analysis.

In one or more embodiments, S240 may also involve setting a monitoring mechanism to track the isolated nodes'status over time. This mechanism may periodically assess the condition of the isolated nodes to determine whether they recover on their own, degrade further, or exhibit any changes that require intervention. If a node shows signs of recovery, the computing task scheduler may initiate a reintegration protocol to gradually reintroduce the node into the cluster.

At least one technical benefit of isolating failed node pairs as described herein is to prevent potential faults from propagating within the cluster, thereby safeguarding the integrity and reliability of ongoing and future jobs.

2.5 Submitting Additional Health Tests

S250, which includes submitting additional health tests, may function to initiate, by a computing task scheduler, a series of supplementary diagnostic assessments on each computing node within the failed node pairs isolated in S240. The additional health test, which may sometimes be referred to herein as discovery (health) tests may be a second or subsequent set of health tests that function to identify or discover a likely computing node of the target set that may be faulty or unhealthy. In a preferred embodiment, the computing task scheduler may determine the type and sequence of additional health tests required to further diagnose the specific faults or weaknesses identified in the initial assessment. The supplementary or additional health tests may be designed to provide more granular data about the computing nodes'operational integrity and pinpoint the exact source of the detected issues.

Additionally, or alternatively, submitting additional health tests may involve selecting tests tailored to the nature of the initial failure indications. For example, if a communication failure was detected between nodes, the additional health tests may include in-depth network diagnostics, such as bandwidth measurement, latency checks, and packet integrity verification. Similarly, if a hardware fault was suspected, the supplementary tests may focus on component-specific assessments, such as memory stress tests, CPU cycle analysis, or disk read/write verification.

Accordingly, in one or more embodiments, the computing task scheduler may configure the additional health tests to run in a specific order or sequence that optimizes the fault detection process. This may involve prioritizing tests based on their diagnostic value, resource requirements, or execution time, to quickly identify the most likely cause of the failure. The computing task scheduler may dynamically adjust the test parameters in real-time based on preliminary results, ensuring a targeted and efficient testing approach.

In some embodiments, S250 may further include coordinating the execution of the additional health tests across multiple nodes in parallel or in a staggered sequence to minimize impact on cluster operations. The computing task scheduler may allocate dedicated resources, such as processing power or network bandwidth, to ensure that the tests do not interfere with other critical tasks or jobs running in the cluster.

Additionally, or alternatively, S250 may involve implementing fault-tolerant testing mechanisms to handle potential failures during the execution of the additional health tests. For instance, if a node fails to respond to a test request, the computing task scheduler may automatically retry the test, escalate to a more detailed diagnostic, or reassign the test to another healthy node to verify the consistency of the failure pattern.

In response to submitting the additional health tests, S250 may function to collect and analyze the resulting diagnostic data from each node. The computing task scheduler may utilize machine learning algorithms, heuristic analysis, or rule-based logic to interpret the data and identify specific fault conditions, such as overheating, memory leaks, network congestion, or hardware malfunctions. The computing task scheduler may then classify the nodes based on their health status, determining whether they are recoverable, require further testing, or should be permanently excluded from the job.

In one or more embodiments, S250 may also involve generating a comprehensive diagnostic report that summarizes the findings of the additional health tests, including details on any detected faults, their potential causes, and recommended remediation actions. The comprehensive diagnostic report may be made available to system administrators or maintenance personnel to facilitate informed decision-making regarding node repair, replacement, or reintegration into the cluster.

2.55 Obtaining Additional Assessment Results

Additionally, or alternatively, S250 may include S255, which includes obtaining additional assessment results, may function to collect, by a computing task scheduler, the diagnostic data and outcomes generated from the additional health tests executed in S250 on each computing node within the failed node pairs. In a preferred embodiment, the computing task scheduler may establish communication with the nodes undergoing testing to retrieve detailed performance metrics, error logs, and other relevant diagnostic information generated during the supplementary assessments.

Additionally, or alternatively, obtaining the additional assessment results may involve actively monitoring the progress of the health tests in real-time, allowing the computing task scheduler to receive updates and partial results from each node as the tests are executed. In one or more embodiments, this real-time monitoring may enable the computing task scheduler to dynamically adjust test parameters or trigger further tests based on preliminary findings, ensuring a comprehensive and accurate fault diagnosis.

Accordingly, in one or more embodiments, the additional assessment results may include various forms of data, such as component-specific performance measurements, communication error rates, hardware integrity checks, software stability indicators, and environmental conditions (e.g., temperature, power fluctuations). This data may provide deeper insights into the nodes' operational status and help pinpoint the root causes of the previously detected failures.

In some embodiments, S255 may further include performing a preliminary validation of the obtained assessment results to ensure data accuracy and consistency. The computing task scheduler may check for anomalies, missing data, or potential errors in the results, and may initiate re-testing or additional diagnostics if necessary. For example, if a node reports inconsistent memory test results, the computing task scheduler may rerun specific memory diagnostics to verify the findings.

Additionally, or alternatively, S255 may involve using analytical techniques, such as pattern recognition, statistical analysis, or machine learning models, to interpret the collected diagnostic data. The computing task scheduler may employ these techniques to identify recurring fault patterns, correlations between different test results, or deviations from expected performance baselines, thereby aiding in the classification of nodes as "healthy," "unhealthy," or "requires further evaluation."

In response to obtaining the additional assessment results, S255 may function to update the operational state of each tested node within the cluster management system. Nodes identified as "healthy" or recovered from initial faults may be reintegrated into the cluster and made available for job execution. Conversely, nodes classified as "unhealthy" may be permanently excluded from the target set and flagged for repair or replacement, while nodes requiring further evaluation may undergo additional diagnostic procedures.

2.6 Identifying Unhealthy Computing Node

Figure 6:
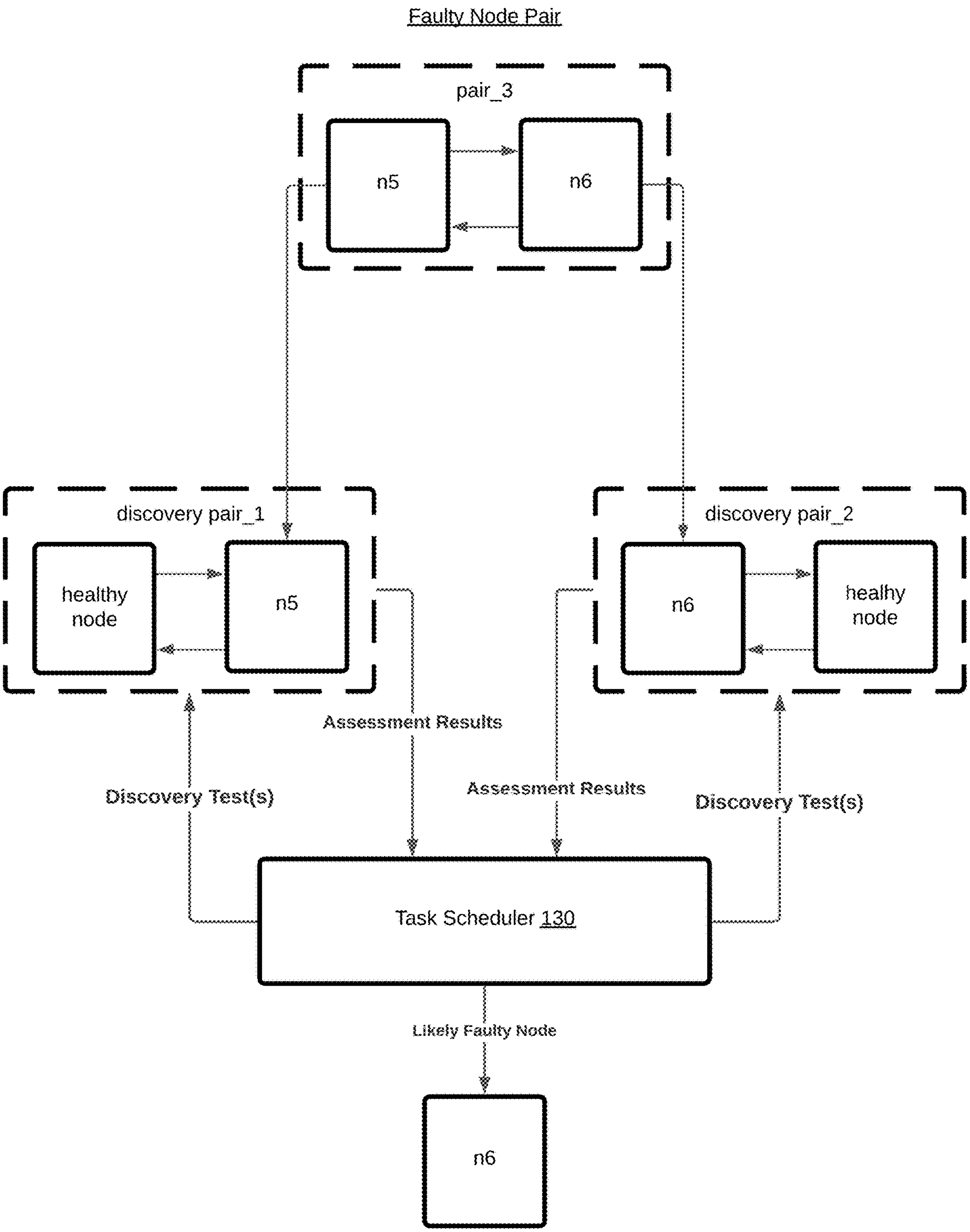
FIG. 6 illustrates an example schematic for submitting additional health tests or discovery tests in accordance with one or more embodiments of the present application.

As shown by way of example in FIG. 6, S260, which includes identifying an unhealthy computing node, may function to analyze, by a computing task scheduler, the additional assessment results obtained in S255 to determine the specific computing node(s) within the target set that are classified as "unhealthy." In a preferred embodiment, the computing task scheduler may evaluate each node's diagnostic data, performance metrics, and error logs against predefined health criteria or thresholds to identify nodes that exhibit signs of malfunction, degradation, or other operational deficiencies.

Additionally, or alternatively, identifying an unhealthy computing node may involve applying a fault classification algorithm to the additional assessment results. This algorithm may use machine learning models, heuristic rules, or statistical techniques to detect patterns indicative of hardware or software faults, such as repeated communication failures, abnormal processing delays, excessive error rates, or inconsistent resource utilization. In one or more embodiments, the fault classification algorithm may prioritize the detection of critical faults that pose a high risk to job execution or cluster stability.

Accordingly, in one or more embodiments, the computing task scheduler may perform a comparative analysis of the diagnostic data to identify deviations from historical performance baselines or expected operational ranges. The comparative analysis may include examining trends in CPU and GPU performance, memory stability, disk integrity, network latency, and other key parameters to determine whether a node's current state significantly differs from its typical behavior or the behavior of other nodes in the cluster.

In some embodiments, S260 may further include conducting a root cause analysis to ascertain the underlying cause of the identified faults. The root cause analysis may involve correlating the detected symptoms with known fault signatures or utilizing domain-specific knowledge to hypothesize potential causes. For example, if a computing node shows signs of frequent overheating, the root cause analysis may consider factors such as cooling system failures, power supply issues, or excessive computational loads.

Figure 7:
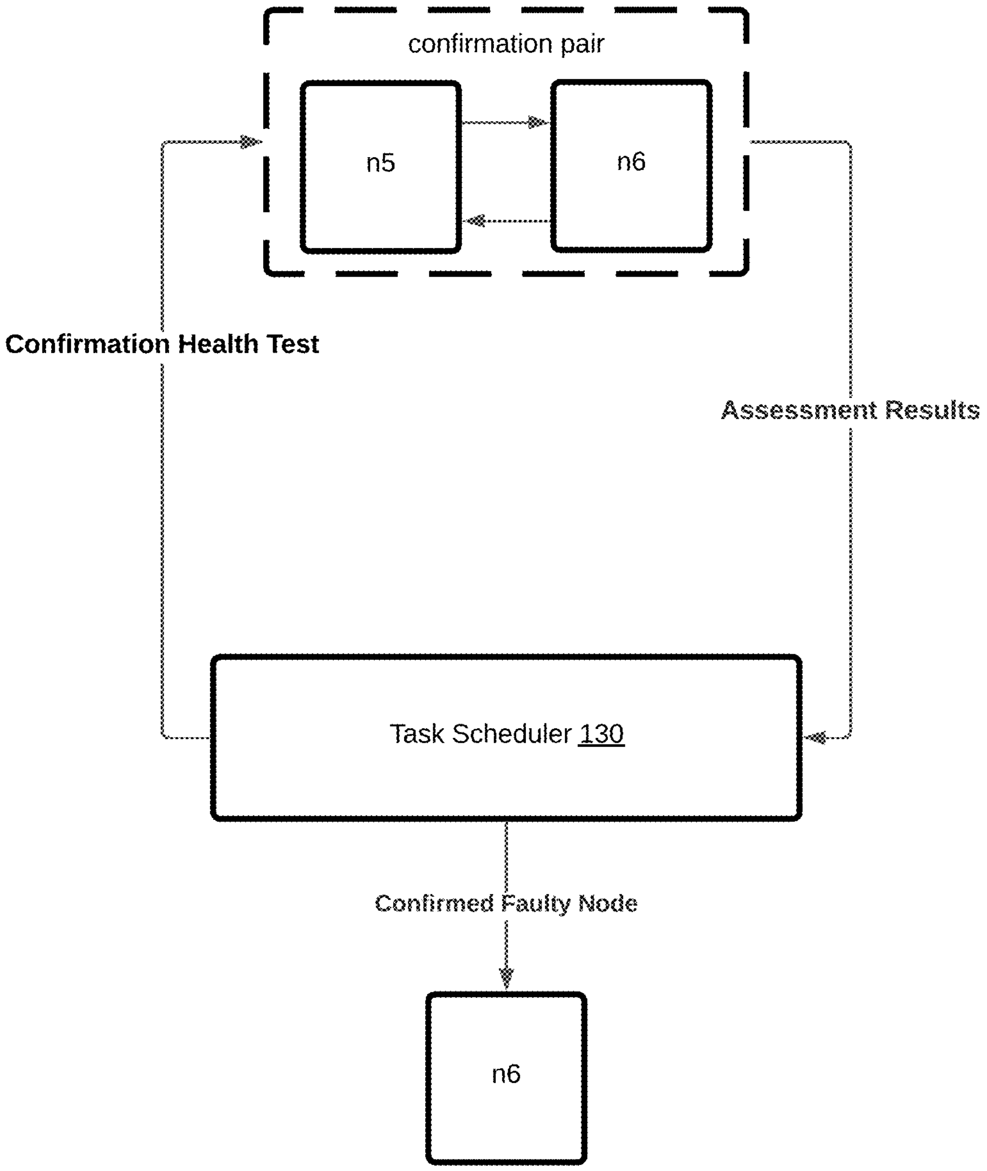
FIG. 7 illustrates an example schematic for submitting additional health tests or confirmatory tests for confirming a state of a likely faulty computing node in accordance with one or more embodiments of the present application.

Additionally, or alternatively, S260 may involve categorizing the identified unhealthy nodes based on the severity and type of the detected faults. Computing nodes with severe or irrecoverable faults, such as hardware malfunctions or critical software crashes, may be marked for immediate exclusion from the job execution and flagged for repair or replacement. In contrast, nodes with recoverable faults or those requiring further investigation may be temporarily isolated or subjected to additional health assessments (i.e., confirmation health test(s)), to confirm their status, as shown by way of example in FIG. 7.

In response to identifying an unhealthy computing node, S260 may function to update the cluster management system with the current health status of each node. The computing task scheduler may mark the identified unhealthy nodes as "unavailable" or "under maintenance," and adjust the resource allocation and job scheduling plans accordingly to ensure that only healthy nodes are utilized for the upcoming job execution.

In one or more embodiments, S260 may also involve generating a health status report for cluster administrators, detailing the identified unhealthy nodes, the specific reasons for their classification, and any recommended actions for remediation or further testing. The health status report may help guide maintenance decisions, repair efforts, or policy adjustments to improve overall cluster reliability and performance.

2.7 Adapting Operating State of Unhealthy Node

S270, which includes adapting the operating state of an unhealthy computing node, may function to modify, by a computing task scheduler, the operational status of the computing nodes identified as "unhealthy" in S260. In a preferred embodiment, the computing task scheduler may change the state of the unhealthy node from "available" for job execution to "unavailable," thereby preventing it from being assigned to any current or future jobs until the detected faults are resolved.

Additionally, or alternatively, adapting the operating state of the unhealthy node may involve executing a series of actions to isolate the node from active cluster operations. These actions may include disabling the node's network connections, halting all ongoing processes, and terminating any active tasks or jobs that the node may be executing. In one or more embodiments, the computing task scheduler may also clear temporary data, cache, or state information on the node to prevent any potential impact on other cluster components.

Accordingly, in one or more embodiments, the computing task scheduler may perform a status update within the cluster management system, recording the new operational state of the unhealthy node. This update may propagate through the cluster, informing all relevant components and systems of the node's exclusion from the resource pool, thereby ensuring that no future job scheduling or resource allocation includes the unhealthy node until further notice.

In some embodiments, S270 may further include initiating an automated remediation process to address the identified faults of the unhealthy node. This process may involve triggering diagnostic or repair scripts, updating software or firmware, or scheduling physical maintenance by a system administrator. The computing task scheduler may coordinate these actions based on the specific nature and severity of the faults, aiming to restore the node to a healthy operational state.

Additionally, or alternatively, S270 may involve setting a monitoring mechanism to track the status of the unhealthy node over time. The monitoring mechanism may periodically assess whether the node has recovered, remained in a degraded state, or worsened further. Based on the observed status changes, the computing task scheduler may decide to reintegrate the node into the cluster, continue monitoring, or escalate to more intensive repair measures.

In response to adapting the operating state of the unhealthy node, S270 may function to adjust the overall resource allocation and job scheduling plans within the cluster management system. The computing task scheduler may reassign any tasks that were originally allocated to the unhealthy node to alternative healthy nodes, ensuring that ongoing and future jobs are not impacted by the exclusion of the faulty node.

In one or more embodiments, S270 may also involve generating an operational state report that details the changes made to the unhealthy node's status, the reasons for these changes, and any recommended actions for remediation or monitoring. This report may be provided to cluster administrators or maintenance personnel to support their decision-making processes and future planning.

At least one technical benefit of adapting the operating state of an unhealthy node as described herein is to maintain the reliability and performance of the cluster by ensuring that nodes identified as faulty are effectively managed and isolated from critical operations.

2.75 Reconfiguring Target Set of Nodes

Additionally, or alternatively, S270 includes S275, which includes reconfiguring the target set of nodes, may function to modify, by a computing task scheduler, the composition and configuration of the target set of computing nodes initially identified in S210 to account for the exclusion of unhealthy nodes determined in S260 and adapted in S270. In a preferred embodiment, the computing task scheduler may dynamically update the target set by removing the unhealthy nodes and selecting additional healthy nodes from the cluster to maintain the required computational capacity and resource availability for the scheduled job.

Additionally, or alternatively, reconfiguring the target set of nodes may involve analyzing the current cluster status, including node availability, resource utilization, and workload distribution, to identify suitable replacements for the excluded nodes. In one or more embodiments, the computing task scheduler may employ predefined node selection policies, such as prioritizing nodes with minimal current workloads, high reliability, or optimal network proximity, to ensure that the new configuration meets or exceeds the performance requirements of the job.

Accordingly, in one or more embodiments, the computing task scheduler may adjust the resource allocation for the job, recalculating the optimal distribution of tasks across the newly configured target set. This adjustment may involve redistributing tasks, reallocating memory or storage resources, or optimizing data flow paths to accommodate the updated node configuration, thereby ensuring minimal impact on job execution performance and efficiency.

In some embodiments, S275 may further include dynamically balancing the load among the remaining and newly selected nodes to prevent overloading any individual node and to maintain cluster stability. The computing task scheduler may monitor real-time performance metrics, such as CPU and GPU utilization, memory usage, and network bandwidth, to ensure that the workload is evenly distributed across the target set and that no single node becomes a bottleneck.

Additionally, or alternatively, S275 may involve implementing fault-tolerant strategies in the reconfigured target set. For example, the computing task scheduler may include additional nodes as backups or hot spares to handle unexpected node failures or performance degradation during job execution. These backup nodes may be configured to automatically take over the workload of a failed node, ensuring continuous job operation without significant delays.

In response to reconfiguring the target set of nodes, S275 may function to update the cluster management system with the new configuration details, including the identities and roles of the included nodes, their respective resource allocations, and any backup or redundancy arrangements. The computing task scheduler may propagate these updates to all relevant components and systems, ensuring consistent understanding and coordination throughout the cluster.

In one or more embodiments, S275 may also involve generating a reconfiguration report for cluster administrators, detailing the changes made to the target set of nodes, the rationale for these changes, and any anticipated impacts on job execution. The reconfiguration report may help administrators understand the current cluster state and plan for future resource needs or adjustments.

2.77 Updating Job Scheduler Database

Additionally, or alternatively, S270 may include S277, which includes updating the job scheduler database, may function to modify, by a computing task scheduler, the internal records and data structures within the job scheduler's database to reflect the changes made during the job preparation process, including node health status, target set reconfiguration, and job execution parameters. In a preferred embodiment, the computing task scheduler may log all relevant updates, such as the exclusion of unhealthy nodes identified in S260, the adaptation of their operating states in S270, and the reconfiguration of the target set of nodes in S275.

Additionally, or alternatively, updating the job scheduler database may involve creating new entries or modifying existing entries in the database to store details of the current job's configuration, including the identities of the computing nodes in the updated target set, their respective resource allocations, any backup or redundancy arrangements, and the estimated job start and end times. In one or more embodiments, the computing task scheduler may also log diagnostic information, such as the results of health assessments and the actions taken to isolate or remediate unhealthy nodes.

Accordingly, in one or more embodiments, the job scheduler database may also be updated to include metadata related to the job execution plan, such as job priority, execution constraints, and performance expectations. This metadata may help guide the computing task scheduler's decision-making processes, such as determining the optimal timing for job execution, selecting appropriate resources, and dynamically adjusting job parameters in response to changes in the cluster environment.

In some embodiments, S277 may further include synchronizing the updated job scheduler database with other relevant databases or systems within the cluster management environment. For example, the computing task scheduler may communicate the updated node health statuses and resource allocations to the cluster's central management system, monitoring tools, or logging services, ensuring consistent and accurate information across all cluster components.

Additionally, or alternatively, S277 may involve setting triggers or alerts within the job scheduler database to notify system administrators or maintenance personnel of critical changes or actions taken during the job preparation process. For instance, the computing task scheduler may generate alerts for any nodes marked as "unhealthy," any deviations from expected job performance, or any actions requiring further investigation or remediation.

In response to updating the job scheduler database, S277 may function to enhance the computing task scheduler's ability to make informed decisions regarding future job assignments, resource allocation, and cluster management strategies. The updated database may serve as a comprehensive repository of historical and real-time data, supporting advanced analytics, predictive modeling, and automated decision-making capabilities.

In one or more embodiments, S277 may also involve generating a summary report of the database updates, outlining the key changes made, the reasons for those changes, and their potential impacts on cluster operations. This report may be provided to cluster administrators or decision-makers to facilitate transparency, accountability, and continuous improvement in cluster management practices.

At least one technical benefit of updating the job scheduler database as described herein is to maintain accurate and up-to-date records of all actions and changes made during the job preparation process, ensuring that the computing task scheduler has access to reliable information for effective job scheduling and resource management.

At least one technical benefit of reconfiguring the target set of nodes as described herein is to maintain optimal job execution performance and cluster reliability by dynamically adapting to changes in node health and availability.

3. Computer-Program Product

The system and methods of the preferred embodiment and variations thereof can be embodied and/or implemented at least in part as a machine configured to receive a computer-readable medium storing computer-readable instructions. The instructions are preferably executed by computer-executable components preferably integrated with the system and one or more portions of the processors and/or the controllers. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that similar to a method with contingent steps, a system or computer readable storage medium can repeat the steps of a method as many times as are needed to ensure that all of the contingent steps have been performed.

Although omitted for conciseness, the preferred embodiments include every combination and permutation of the implementations of the systems and methods described herein.

As a person skilled in the art will recognize from the previous detailed description and from the figures and claims, modifications and changes can be made to the preferred embodiments of the invention without departing from the scope of this invention defined in the following claims.

We claim:

1. A method for pre-job deployment node testing in a computing cluster, the method comprising:

identifying a target set of computing nodes within a cluster of computing nodes that are scheduled to execute a job at a future start time based on identifying, by a computing task scheduler, a request to execute the job within the cluster of computing nodes;

submitting, by the computing task scheduler, prior to the future start time, a set of initial health tests of a node health assessment to the target set of computing nodes for execution based on the identification of the target set of computing nodes;

identifying at least one pair of computing nodes that failed the set of initial tests of the node health assessment based on assessment results obtained from an execution of the set of initial health tests by the target set of computing nodes;

isolating the at least one pair of computing nodes from a remainder of the computing nodes of the target set of computing nodes that did not fail the set of initial health tests;

submitting one or more additional health tests to each computing node of the at least one pair of computing nodes;

identifying a given computing node of the least one pair of computing nodes as being an unhealthy computing node based on assessment results obtained from an execution of the one or more additional health tests; and adapting an operating state of the unhealthy computing node from a state of available for executing the job to a state of unavailable for executing the job based on identifying the given computing node as the unhealthy computing node.

2. The method according to claim 1, wherein:

the one or more additional health tests include a secondary health test that identifies which computing node of the at least one pair of computing nodes is unhealthy, the second health test includes:

forming a first node pairing between a first computing node of the least one pair of computing nodes and a healthy computing node of the target set of computing nodes;

forming a second node pairing between a second computing node of the least one pair of computing nodes and the healthy computing node of the target set of computing nodes;

executing by the first node pairing and the second node pairing the second health test; and the identification of the unhealthy computing node is further based on assessment results of the execution of the second health test by the first node pairing and the second node pairing.

3. The method according to claim 2, wherein:

the one or more additional health tests include a third health test that confirms a faultiness of the unhealthy computing node, the second health test includes:

forming a node pairing between the unhealthy computing node and another healthy computing node of the target set of computing nodes;

executing by the node pairing the third health test; and the confirmation of the faultiness of the unhealthy computing node is further based on assessment results of the execution of the third health test by the node pairing.

4. The method according to claim 1, further comprising:

reconfiguring the target set of computing nodes within the cluster of computing nodes by excluding the unhealthy computing node from executing the job at the future start time.

5. The method according to claim 1, further comprising:

determining, by the computing task scheduler, whether to submit the node health assessment to the target set of computing nodes based on the future start time of the job, wherein the determining includes identify whether an expected duration of the node health assessment exceeds the future start time of the job.

6. The method according to claim 1, further comprising:

identifying whether an expected extent of the node health assessment, if executed, exceeds the future start time of the job;

scheduling the submission of the node health assessment to the target set of computing node for a period not exceeding the start time of the executed job based on the expected extent of the node health assessment not exceeding the future start time of the job.

7. The method according to claim 1, wherein the computing task scheduler is configured to:

assess an impact of the execution of the set of initial health tests on the future start time of the job, and adjust a timing of the execution of the set of initial health tests ensuring a completion of the set of the initial health tests before the future start time of the job.

8. The method according to claim 1, wherein the execution of the set of initial health tests includes:

forming a plurality of distinct pairs of computing nodes from the target set of computing nodes; and executing a bi-directional testing by each pair of computing nodes of the plurality of distinct pairs of computing nodes.

9. The method according to claim 8, wherein executing the bi-directional testing causes each respective pair of computing nodes of the plurality of distinct pairs of computing nodes to:

establish a communication channel between computing nodes defining each respective pair of computing nodes, and execute the set of initial health tests by transmitting data associated with the execution of the set of initial health tests via the communication channel of each respective pair of computing nodes.

10. A computer-program product comprising a non-transitory machine-readable storage medium storing computer instructions that, when executed by one or more processors, perform operations comprising:

identifying a target set of computing nodes within a cluster of computing nodes that are scheduled to execute a job at a future start time based on identifying, by a computing task scheduler, a request to execute the job within the cluster of computing nodes;

submitting prior to the future start time, by the computing task scheduler, a set of initial health tests of a node health assessment to the target set of computing nodes for execution based on the identification of the target set of computing nodes;

identifying at least one pair of computing nodes that failed the set of initial tests of the node health assessment based on assessment results obtained from an execution of the set of initial health tests by the target set of computing nodes;

isolating the at least one pair of computing nodes from a remainder of the computing nodes of the target set of computing nodes that did not fail the set of initial tests;

submitting one or more additional health tests to each computing node of the at least one pair of computing nodes;

identifying a given computing node of the least one pair of computing nodes as being an unhealthy computing node based on assessment results obtained from an execution of the one or more additional health tests; and adapting an operating state of the unhealthy computing node from a state of available for executing the job to a state of unavailable for executing the job based on identifying the given computing node as the unhealthy computing node.

11. The computer-program product according to claim 10, wherein:

the one or more additional health tests include a secondary health test that identifies which computing node of the at least one pair of computing nodes is unhealthy, the second health test includes:

forming a first node pairing between a first computing node of the least one pair of computing nodes and a healthy computing node of the target set of computing nodes;

forming a second node pairing between a second computing node of the least one pair of computing nodes and the healthy computing node of the target set of computing nodes;

executing by the first node pairing and the second node pairing the second health test; and the identification of the unhealthy computing node is further based on assessment results of the execution of the second health test by the first node pairing and the second node pairing.

12. The computer-program product according to claim 11, wherein:

the one or more additional health tests include a third health test that confirms a faultiness of the unhealthy computing node, the second health test includes:

forming a node pairing between the unhealthy computing node and another healthy computing node of the target set of computing nodes;

executing by the node pairing the third health test; and the confirmation of the faultiness of the unhealthy computing node is further based on assessment results of the execution of the third health test by the node pairing.

13. The computer-program product according to claim 10, further comprising:

reconfiguring the target set of computing nodes within the cluster of computing nodes by excluding the unhealthy computing node from executing the job at the future start time.

14. The computer-program product according to claim 10, further comprising:

determining, by the computing task scheduler, whether to submit the node health assessment to the target set of computing nodes based on the future start time of the job, wherein the determining includes identify whether an expected duration of the node health assessment exceeds the future start time of the job.

15. The computer-program product according to claim 10, further comprising:

identifying whether an expected extent of the node health assessment, if executed, exceeds the future start time of the job;

scheduling the submission of the node health assessment to the target set of computing node for a period not exceeding the start time of the executed job based on the expected extent of the node health assessment not exceeding the future start time of the job.

16. The computer-program product according to claim 10, wherein the computing task scheduler is configured to:

assess an impact of the execution of the set of initial health tests on the future start time of the job, and adjust a timing of the execution of the set of initial health tests ensuring a completion of the set of the initial health tests before the future start time of the job.

17. The computer-program product according to claim 10, wherein the execution of the set of initial health tests includes:

forming a plurality of distinct pairs of computing nodes from the target set of computing nodes; and executing a bi-directional testing by each pair of computing nodes of the plurality of distinct pairs of computing nodes.

18. The computer-program product according to claim 17, wherein executing the bi-directional testing causes each respective pair of computing nodes of the plurality of distinct pairs of computing nodes to:

establish a communication channel between computing nodes defining each respective pair of computing nodes, and execute the set of initial health tests by transmitting data associated with the execution of the set of initial health tests via the communication channel of each respective pair of computing nodes.

19. A computer-implemented method comprising:

identifying a target set of computing nodes within a cluster of computing nodes that are scheduled to execute a job at a future start time based on identifying, by a task scheduler, a request to execute the job within the cluster of computing nodes;

submitting by the task scheduler, during an execution of a prolog script, a set of initial health tests to the target set of computing nodes for execution based on the identification of the target set of computing nodes;

identifying at least one pair of computing nodes that failed the set of initial tests based on assessment results obtained from an execution of the set of initial health tests by the target set of computing nodes;

isolating the at least one pair of computing nodes from a remainder of the computing nodes of the target set of computing nodes that did not fail the set of initial health tests;

submitting an additional health test to each computing node of the at least one pair of computing nodes;

identifying a given computing node of the least one pair of computing nodes as being an unhealthy computing node based on assessment results obtained from an execution of the additional health test; and adapting an operating state of the unhealthy computing node from a state of available for executing the job to a state of unavailable for executing the job based on identifying the given computing node as the unhealthy computing node.

20. The computer-implemented method according to claim 19, wherein:

the additional health test comprises a discovery health test that identifies which computing node of the at least one pair of computing nodes is unhealthy, the discovery health test includes:

forming a first node pairing between a first computing node of the least one pair of computing nodes and a healthy computing node of the target set of computing nodes;

forming a second node pairing between a second computing node of the least one pair of computing nodes and the healthy computing node of the target set of computing nodes;

executing by the first node pairing and the second node pairing the second health test; and the identification of the unhealthy computing node is further based on assessment results of the execution of the discovery health test by the first node pairing and the second node pairing.

* * * * *